(12) United States Patent
Illikkal et al.

(10) Patent No.: US 7,110,356 B2
(45) Date of Patent: Sep. 19, 2006

(54) PRE-PROVISIONING A LIGHT PATH SETUP (75) Inventors: Mashood Illikkal, Lowell, MA (US); Peter W. Bretschneider, Brookline, NH (US)

(73) Assignee: Fujitsu Limited, Kanagawa-ken (JP)

( * ) Notice: Subject to any disclaimer, the term of this patent is extended or adjusted under 35 U.S.C. 154(b) by 1001 days.

(21) Appl. No.: 09/999,000

(22) Filed: Nov. 15, 2001

(65) Prior Publication Data

US 2003/0090995 A1   May 15, 2003

(51) Int. Cl.
 *H04L 1/00* (2006.01)
(52) U.S. Cl. .......................... 370/222; 370/228; 398/3; 398/5
(58) Field of Classification Search ............ 714/3, 714/4; 370/222–225, 227–228, 216–220; 709/238–242; 398/2–5
See application file for complete search history.

(56) References Cited

U.S. PATENT DOCUMENTS

| | | | |
|---|---|---|---|
| 3,652,798 A | 3/1972 | McNeilly et al. | 179/15 AL |
| 4,446,551 A | 5/1984 | Seo | 370/16 |
| 4,538,026 A | 8/1985 | Yasue | 178/2 R |
| 4,930,119 A | 5/1990 | Kobayashi et al. | 370/16.1 |
| 5,105,188 A | 4/1992 | Jung et al. | 340/825.05 |
| 5,179,548 A | 1/1993 | Sandersara | 370/16.1 |
| 5,442,620 A | 8/1995 | Kremer | 370/16.1 |
| 5,469,428 A | 11/1995 | Tokura et al. | 370/161 |
| 5,550,805 A | 8/1996 | Takatori et al. | 370/16.1 |
| 5,663,950 A | 9/1997 | Lee et al. | 370/224 |
| 5,793,746 A | 8/1998 | Gerstel et al. | 370/228 |
| 5,848,055 A * | 12/1998 | Fedyk et al. | 370/228 |
| 5,956,319 A | 9/1999 | Meli | 370/224 |
| 6,076,116 A | 6/2000 | Duque-Anton et al. | 709/251 |
| 6,111,853 A | 8/2000 | Goodman | 370/224 |
| 6,160,648 A | 12/2000 | Oberg et al. | 359/110 |
| 6,697,373 B1 * | 2/2004 | Sandstrom | 370/405 |
| 6,725,401 B1 * | 4/2004 | Lindhorst-Ko | 714/47 |

OTHER PUBLICATIONS

Newton, Newton's Telecom Dictionary, Oct. 1998, Telecom Books, p. 723.*

* cited by examiner

*Primary Examiner*—Chi Pham
*Assistant Examiner*—Ronald Abelson
(74) *Attorney, Agent, or Firm*—Weingarten, Schurgin, Gagnebin & Lebovici LLP (57) ABSTRACT

A system and method of reserving node resources along a desired path through a communications network that can be used to reserve resources across a fault such as an unconnected node interface or a disconnected link. The resource reservation technique is performed on a communications system including a plurality of nodes interconnected by at least one path to form a ring communications network. A communications link is identified within the path such that at least one node is disposed on a first side of the link and at least one node is disposed on a second side of the link. The identified link may have a fault. Resources are then reserved on the nodes disposed on the first side of the link by accessing the nodes over the path in a first direction around the ring network. Next, resources are reserved on the nodes disposed on the second side of the link by accessing the nodes from the first side over the path in a second direction around the ring network, in which the second direction is opposite the first direction. The path is then established without reallocating the node reservations.

4 Claims, 6 Drawing Sheets

PRE-PROVISIONING A LIGHT PATH SETUP

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to techniques for reserving resources in communications systems, and more specifically to a resource reservation technique that can be used to reserve resources across a non-operational communications link.

A conventional communications system includes a plurality of nodes interconnected by a plurality of paths to form a communications network. For example, the communications network may comprise a Multi-Protocol Label Switching (MPLS) based network. Each node on the network comprises a computer system or some other device such as a router or switch. Further, each network node is typically configured to forward communications packets (e.g., control or data packets) to at least one neighboring node on the network by receiving a packet at one of its input ports, determining a destination address by examining information in a header field of the packet, and forwarding the packet to the neighboring node via an appropriate output port.

Each node on the network typically forwards communications packets using "hop-to-hop" routing or explicit routing. In hop-to-hop routing, each network node individually determines where to forward a packet based on the packet header information and topology information gathered via a routing protocol. In explicit routing, each network node forwards packets along a previously established path ("explicit path"), as indicated in the packet header field. One or more nodes on the MPLS-based network can program and maintain such explicit paths via a signaling protocol such as the connection-oriented Constraint-based Routing Label Distribution Protocol (CR-LDP) or the connectionless Resource Reservation Protocol (RSVP). Network nodes can also use the signaling protocol to reserve node resources including wavelengths, bandwidths, and/or Quality of Service (QoS) levels along respective paths. Reserving node resources along a path in a network is often referred to as "provisioning the path".

One shortcoming of the conventional communications system is that node resources can normally be reserved only along explicit paths, in which there are viable links interconnecting the nodes through which the paths traverse. For example, a node at the start of an explicit path (i.e., a "source" node) may specify a list of nodes along the path starting with the source node and ending with a node at the end of the explicit path (i.e., a "sink" node). The source node may then reserve resources along the explicit path by sending control packets to each successive node on the specified list, thereby assuring a desired QoS level for data packets forwarded along the path.

However, such resource reservation techniques typically cannot be used to reserve node resources along a path that is currently incapable of forwarding communications packets. For example, a node interface in the path may be unconnected, or a link interconnecting neighboring nodes along the path may be faulty, broken, or otherwise disconnected. Being able to reserve resources across an unconnected node interface or a disconnected link would allow packets to be forwarded along the path immediately after the packet forwarding capability of the path is restored. Such a capability would also enhance the flexibility of network deployment.

It would therefore be desirable to have an improved technique for reserving resources in a communications system. Such a resource reservation technique would allow the reservation of node resources along paths that are currently incapable of forwarding communications packets. It would also be desirable to have a resource reservation technique that can be used to pre-provision paths during network deployment.

BRIEF SUMMARY OF THE INVENTION

In accordance with the present invention, a system and method of reserving node resources along a desired path through a communications network is disclosed that can be used to reserve resources across a fault such as an unconnected node interface or a disconnected link. Benefits of the presently disclosed resource reservation technique are achieved by using at least one temporary indirect path to reserve resources of at least one node that is currently unreachable via the desired path through the network.

In one embodiment, the resource reservation technique is performed on a communications system including a plurality of nodes interconnected by a plurality of paths to form at least one communications network. In the presently disclosed embodiment, the network comprises a Multi-Protocol Label Switching (MPLS) based network having a single ring or multiple ring topology.

The plurality of nodes on the communications network includes at least one source node at a first end of a path and at least one sink node at a second end of the path. Further, at least the source node is communicably coupleable to a user device. Each node can be configured to forward communications packets (e.g., control or data packets) to neighboring nodes via "hop-to-hop" or explicit routing. Each node on the network is connected to at least one neighboring node by at least one control path for carrying control packets and at least one data path for carrying data packets, or alternatively at least one respective path for carrying both control and data packets. The plurality of network nodes can therefore be configured to forward control packets via a signaling protocol employing an "out-of-band" control technique, in which the control and data packets are sent between neighboring nodes along respective communications paths, or an "in-band" control technique, in which the control packets are sent between neighboring nodes along the same communications path as the data packets. Such control packets include messages for reserving node resources, e.g., wavelengths, bandwidths, and/or Quality of Service (QoS) levels along respective paths, and messages for establishing/re-establishing, monitoring, and/or tearing-down paths interconnecting the nodes. The signaling protocol may be a connection-oriented protocol or a connectionless protocol. In the disclosed embodiment, the signaling protocol is the connectionless Resource Reservation Protocol (RSVP).

Each node on the communications network can be configured to execute signaling software out of at least one memory included therein. At the top of the signaling software stack is a network protocol manager operative to control the flow of data to and from the layers of the stack below. The network protocol manager interfaces with an application layer, which in turn interfaces with a central protocol manager comprising a routine at the next lower layer within the stack. The central protocol manager interfaces with a routing topology manager comprising a routine in the same layer of the stack as the central protocol manager, and additionally a signaling protocol manager in the layer directly below. The signaling protocol manager interfaces with the node's switching hardware, which comprises a suitable data communications interface.

The disclosed resource reservation technique can be used to reserve resources across a fault in a communications path such as an unconnected node interface or a disconnected link. In the event the fault is located between the source node and its neighboring node in a desired explicit path, node resources along the desired path are reserved via a single temporary indirect path. A user sends at least one control message to the source node via a user device communicably coupled to the source node such as a first control message indicating the desired explicit path to be established between the source node and the sink node, and a second control message indicating at least one resource (e.g., a wavelength $\lambda$) to be reserved along the desired path. Next, the network protocol manager resident on the source node provides the desired path and wavelength $\lambda$ to the central protocol manager of the source node, which attempts to establish the desired path and reserve the wavelength $\lambda$ along the path by directing the transmission of at least one suitable control message to the neighboring node. Because there is a fault located between the source node and the neighboring node, the source node receives a PathError message in response to the control message sent to the neighboring node. The central protocol manager then sends a request to the routing topology manager for an indication of a suitable temporary indirect path to the neighboring node that bypasses the fault between the source node and the neighboring node. Such a suitable temporary indirect path traverses a plurality of network nodes including each node along the desired explicit path. In response to this request, the routing topology manager provides the indication of the temporary indirect path to the central protocol manager. Next, the central protocol manager (1) establishes the temporary indirect path from the source node to its neighboring node using a predetermined path identifier, and (2) reserves the wavelength $\lambda$ along the temporary indirect path according to the requirements of the desired explicit path. In the disclosed embodiment, the desired explicit path requirements are passed to each node along the temporary indirect path via a first RSVP opaque object. An RSVP opaque object is a user-defined data type that employs one or more spare fields within an RSVP control message for storing information to be passed to the network nodes. The central protocol manager then tears-down the temporary indirect path while retaining the wavelength reservations of the desired explicit path. In the disclosed embodiment, a second RSVP opaque object is employed to distinguish between a user-driven tear-down control message requiring the release of node resources and a failure-driven tear-down control message that does not require the release of node resources. Because the central protocol manager employs the failure-driven tear-down control message to tear-down the temporary indirect path, the wavelength reservations of the desired explicit path are retained after the temporary path is torn-down. In the event the link between the source node and its neighboring node becomes operational to enable the establishment of the desired explicit path between the source node and the sink node, the central protocol manager establishes the desired explicit path from the source node to the sink node using the same predetermined path identifier of the temporary indirect path. This path identifier is provided to the central protocol manager resident on each node of the desired explicit path when establishing the path to direct the respective central protocol managers not to reallocate the prior wavelength reservations.

In the event the fault is located between a pair of neighboring nodes that does not include the source node, node resources are reserved via a temporary direct path and a temporary indirect path. A user sends a first control message to the source node indicating a desired explicit path to be established between the source node and the sink node, and a second control message indicating at least one resource such as a wavelength $\lambda$ to be reserved along the desired explicit path. Next, the network protocol manager on the source node provides the desired path and wavelength $\lambda$ to the central protocol manager of the source node, which attempts to establish the desired path and reserve the wavelength $\lambda$ along that path. Because there is a fault located between a pair of neighboring nodes in the desired path, the source node receives a PathError message in response to its attempt to establish the path indicating that at least one of the nodes in the desired path is currently unreachable. The central protocol manager then sends a first request to the routing topology manager of the source node for an indication of a suitable temporary direct path traversing the reachable node(s) of the desired path. In response to this first request, the routing topology manager provides the indication of the temporary direct path to the central protocol manager. Next, the central protocol manager (1) establishes the temporary direct path traversing the reachable nodes of the desired path using a predetermined path identifier, and (2) reserves the wavelength $\lambda$ along the temporary direct path according to the requirements of the desired explicit path, which may be passed to each node of the temporary direct path via a first RSVP opaque object. The central protocol manager then sends a second request to the routing topology manager for an indication of a suitable temporary indirect path traversing the unreachable node(s) in the desired path. Such a suitable temporary indirect path traverses each node along the desired path that cannot be reached by the source node via the temporary direct path. In response to this second request, the routing topology manager provides the indication of the temporary indirect path to the central protocol manager. Next, the central protocol manager (1) establishes the temporary indirect path using the same predetermined path identifier of the temporary direct path, and (2) reserves the wavelength $\lambda$ along the temporary indirect path according to the requirements of the desired explicit path, which may be passed to each node of the temporary indirect path via a second RSVP opaque object. The central protocol manager then tears-down the temporary direct and indirect paths while retaining the wavelength reservations of the desired explicit path. Because the central protocol manager employs the failure-driven tear-down control message to tear-down the temporary direct and indirect paths, the wavelength reservations along the desired explicit path are retained after the temporary paths are torn-down. In the event the fault is repaired, the central protocol manager establishes the desired explicit path from the source node to the sink node using the same predetermined path identifier of the temporary direct and indirect paths. This path identifier is provided to the central protocol manager resident on each node of the desired path to direct the respective central protocol managers not to reallocate the prior wavelength reservations.

By reserving resources of at least one network node along a desired explicit path via at least one temporary direct/indirect path, node resources can be reserved across a fault such as an unconnected node interface or a disconnected link in the path. This resource reservation technique makes it possible to reserve node resources along a path that is currently incapable of forwarding communications packets, thereby allowing packets to be forwarded along the path as soon as the packet forwarding capability of the path is restored.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

A system and method of reserving resources on a communications network is provided that can be used to reserve resources across a fault such as an unconnected node interface or a disconnected link in a desired path through the network. Such reservation of resources is achieved by establishing a temporary indirect path that bypasses the fault in the desired path.

Figure 1:
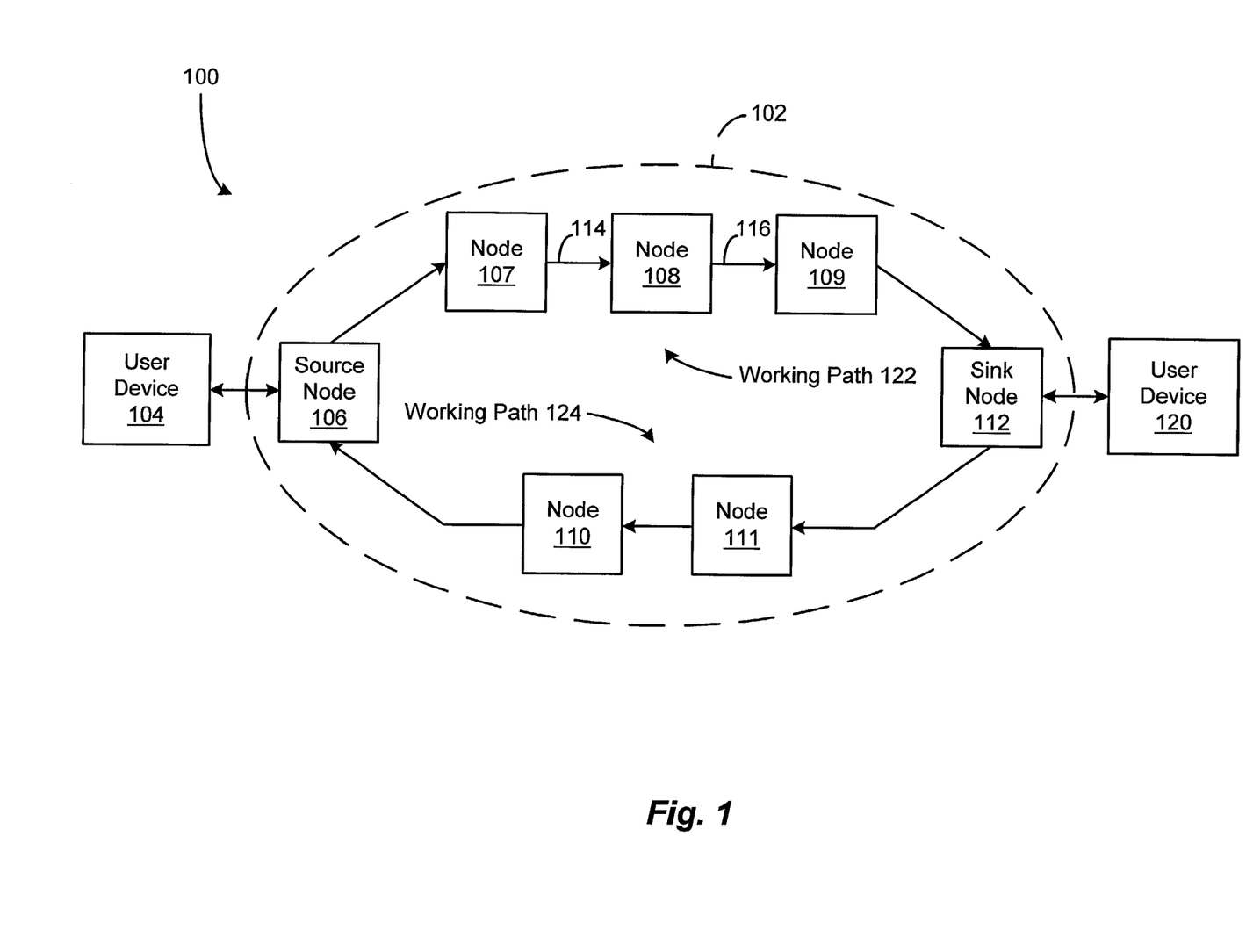
FIG. 1 is a block diagram depicting the operation of a communications network in a fault-free condition according to the present invention.

FIG. 1 depicts an illustrative embodiment of a communications system 100 configured to perform resource reservation techniques in accordance with the present invention. The communications system 100 includes a communications network 102 comprising a source node 106, a sink node 112, and a plurality of intermediate nodes 107–111 interconnected by a plurality of communications paths (e.g., paths 114 and 116), and at least one source user device 104 and at least one destination user device 120 coupled to the network 102. In the presently disclosed embodiment, the communications system 100 comprises a wavelength Division Multiplexed (NDM) optical transmission system. Further, the communications network 102 comprises a Multi-Protocol Label Switching (MPLS) based optical network having a ring topology. Accordingly, the nodes 106–112 are shown in FIG. 1 as being coupled to one another in the shape of a closed loop, in which each node is coupled to two (2) conceptually adjacent ("neighboring") nodes. Although the plurality of nodes 106–112 is depicted in FIG. 1 as forwarding packets through the network 102 in a clockwise fashion, it should be understood that the communications system 100 may alternatively comprise one or more counter-rotating networks.

The MPLS-based network 102 is configured to transfer at least one labeled communications packet between the source node 106 and the sink node 112 via at least one Label Switched Path (LSP). For example, the network 102 may be configured to transfer at least one labeled packet from the source node 106 to the sink node 112 via a first working LSP 122 that traverses the nodes 107–109, and transfer at least one labeled packet from the sink node 112 back to the source node 106 via a second working LSP 124 that traverses the nodes 110–111. Each of the nodes 106–112 of the MPLS-based network 102 comprises a Label Switching Router (LSR) configured to implement label switching on the network 102. Specifically, the source node 106 and the sink node 112 comprise respective edge LSRs. Further, the user devices 104 and 120 are communicably coupled to the MPLS-based network 102 via the edge LSRs 106 and 112, respectively. The architecture for MPLS is described in Internet Draft draft-ietf-mpls-arch-07.txt July 2000, which is incorporated herein by reference.

It is understood that the communications network 102 may comprise a Local Area Network (LAN), a Wide Area Network (WAN), a global computer network such as the Internet, or any other network for communicably coupling the respective network nodes 106–112. Further, in alternative embodiments, the network 102 may comprise a non-MPLS-based network including a plurality of nodes suitably configured for performing the functions attributable to the respective devices described herein.

The plurality of nodes 106–112 is configured to forward packets (i.e., control and data packets) to neighboring nodes on the network 102. For example, each node 106–112 may be configured to forward packets to its neighboring nodes via (1) "hop-to-hop" routing, in which each network node individually determines where to forward a packet based on information in a header field of the packet and topology information gathered via a routing protocol, or (2) explicit routing, in which each packet is forwarded along an established path as indicated in the packet header field. Further, each node 106–112 may forward control packets to its neighboring nodes via a signaling protocol employing either an "out-of-band" or "in-band" control technique. Accordingly, the nodes 106–112 may be coupled to their respective neighboring nodes by (1) at least one control path for carrying control packets and at least one data path for carrying data packets to enable the out-of-band control technique, or (2) at least one respective path for carrying both control and data packets to enable the in-band control technique.

Figure 2A:
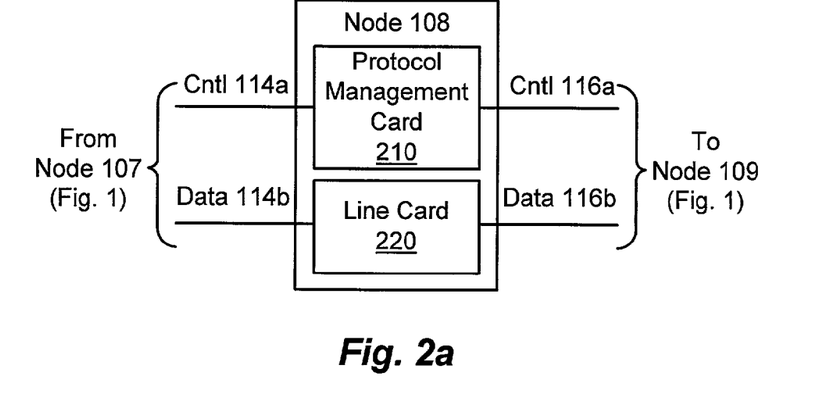
FIG. 2a is a block diagram depicting an exemplary node on the communications network of FIG. 1.

FIG. 2a depicts an exemplary configuration of the node 108, which is included in the communications network 102 (see FIG. 1). It should be understood that each of the nodes 106–112 on the network 102 has a configuration like that of the node 108. In the illustrated embodiment, the node 108 includes a protocol management card 210 coupled between the neighboring nodes 107 and 109 via control paths 114a and 116a, respectively; and, a line card 220 coupled between the neighboring nodes 107 and 109 via corresponding data paths 114b and 116b, respectively. Accordingly, the node 108 is coupled to its neighboring nodes 107 and 109 to enable an out-of-band control technique.

As described above, the communications system 100 (see FIG. 1) comprises a WDM optical transmission system. Accordingly, the protocol management card of each node 106–112 includes a communications interface (not shown) configured to send (receive) electrical and/or optical control signals to (from) the control paths coupled thereto to reserve resources such as wavelengths, bandwidths, and/or Quality of Service (QoS) levels along respective paths, and program (i.e., establish/reestablish), deprogram ("tear-down"), and/or otherwise maintain the corresponding data paths. Further, the line card of each node 106–112 includes a communications interface (not shown) configured to transfer optical data signals (e.g., Optical Carrier (OC) level 192) along the optical data paths coupled thereto.

As also described above, each node 106–112 of the MPLS-based network 102 comprises a respective LSR. It should be understood, however, that each node 106–112 may alternatively comprise a respective computer system or some other device such as a switch. Similarly, each user device 104 and 120 may comprise a computer system, a router, or a switch. Accordingly, each node 106–112 (and each user device 104 and 120) of the communications system 100 comprises a computerized device including at least one processor operative to execute programmed instructions out of at least one memory such as Random Access Memory (RAM) or a combination of RAM and Read Only Memory (ROM).

Figure 2B:
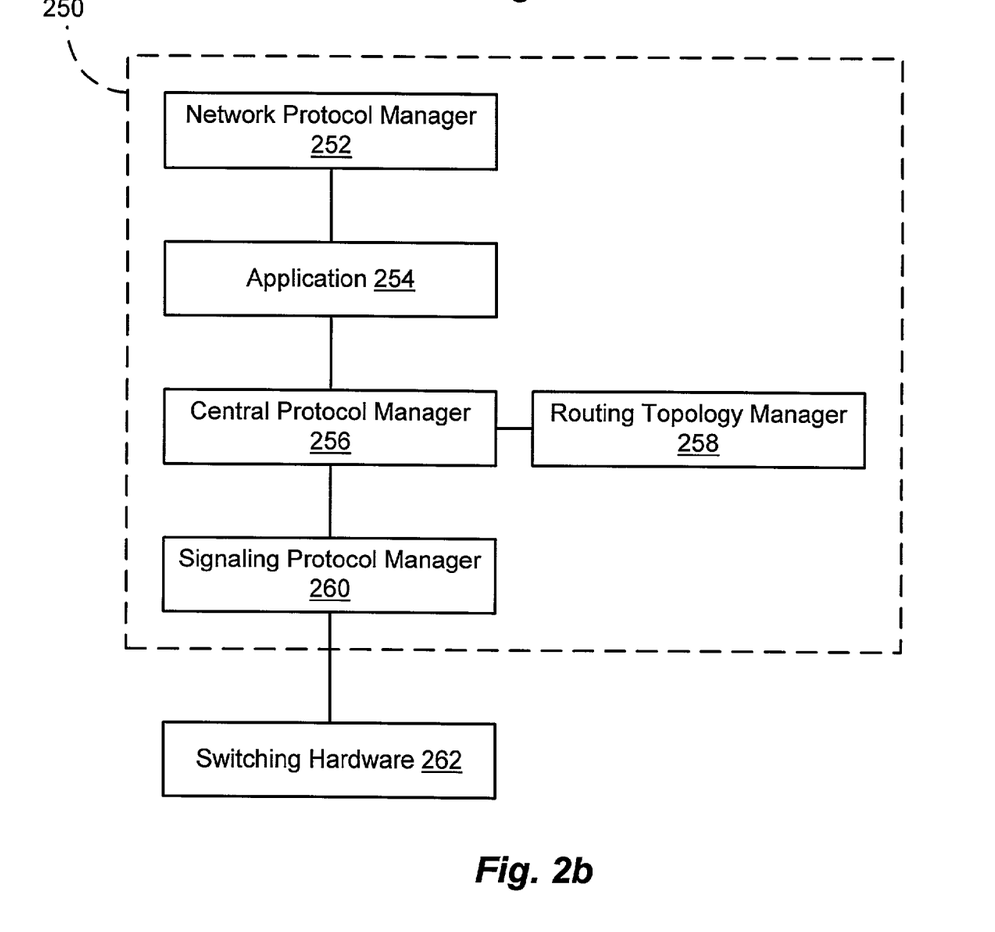
FIG. 2b is a block diagram depicting a signaling software stack employed by the nodes of the communications network of FIG. 1.

FIG. 2b depicts a conceptual representation of a signaling software stack 250, which is resident in and executable out of at least one respective memory of each node 106–112 on the network 102 (see FIG. 1). At the top of the stack 250 is a network protocol manager 252 operative to direct the flow of control messages to (from) the layers of the stack below. The network protocol manager 252 interfaces with an application layer 254, which in turn interfaces with a central protocol manager 256 comprising a routine at the next lower layer of the stack 250. The central protocol manager 256 interfaces with (1) a routing topology manager 258 comprising a routine that is in the same layer of the stack 250 as the central protocol manager 256, and (2) a signaling protocol manager 260 in the layer directly below. In the disclosed embodiment, the signaling protocol employed by the signaling protocol manager 260 is the connectionless Resource Reservation Protocol (RSVP). Finally, the signaling protocol manager 260 interfaces with the node's switching hardware 262, which may include the OC-192 data communications interface.

In the illustrated embodiment, the communications network 102 (see FIG. 1) is an MPLS-based network, and the plurality of nodes 106–112 is configured to forward packets to neighboring nodes on the network 102 via explicit routing. Accordingly, the user device 104 may provide at least one unlabeled packet to the source node 106, which applies a suitable label to the unlabeled packet. The label applied to the packet by the source node 106 is then used to program the forwarding state of the packet over several hops through the network 102, e.g., from the source node 106 to the sink node 112.

Specifically, each node 106–112 maintains a respective label switching forwarding table that includes a plurality of entries. Each entry of the forwarding table is indexed by the label applied to the incoming packet and includes (1) an outgoing label for the packet, (2) an indication of an interface of the node to be used for forwarding the packet, and (3) the address of the next hop node. In the illustrated embodiment, each node 106–112 is configured to forward packets through the MPLS-based network 102 via the RSVP signaling protocol. Further, paths through the network 102 may be established, reestablished, or torn-down by suitably modifying the respective label switching forwarding tables maintained by the nodes 106–112.

Those of ordinary skill in the art will appreciate that the RSVP signaling protocol can be used to reserve node resources including wavelengths, bandwidths, and/or Quality of Service (QoS) levels along respective paths in a network. The presently disclosed communications system 100 (see FIG. 1) employs the connectionless RSVP signaling protocol to reserve resources along paths that are currently incapable of forwarding packets. For example, the non-operational path may comprise a fault such as an unconnected node interface or a disconnected link. Further, the resource reservation techniques performed by the disclosed system 100 are implemented by appropriately modifying the processing of the central protocol manager 256 (see FIG. 2b) by the respective nodes 106–112. In alternative embodiments, the communications system 100 may employ any suitable connection-oriented or connectionless signaling protocol, and the resource reservation techniques performed by the system 100 may be implemented by appropriately modifying the processing of the network protocol manager 252 (see FIG. 2b) by the respective nodes 106–112.

Figure 3:
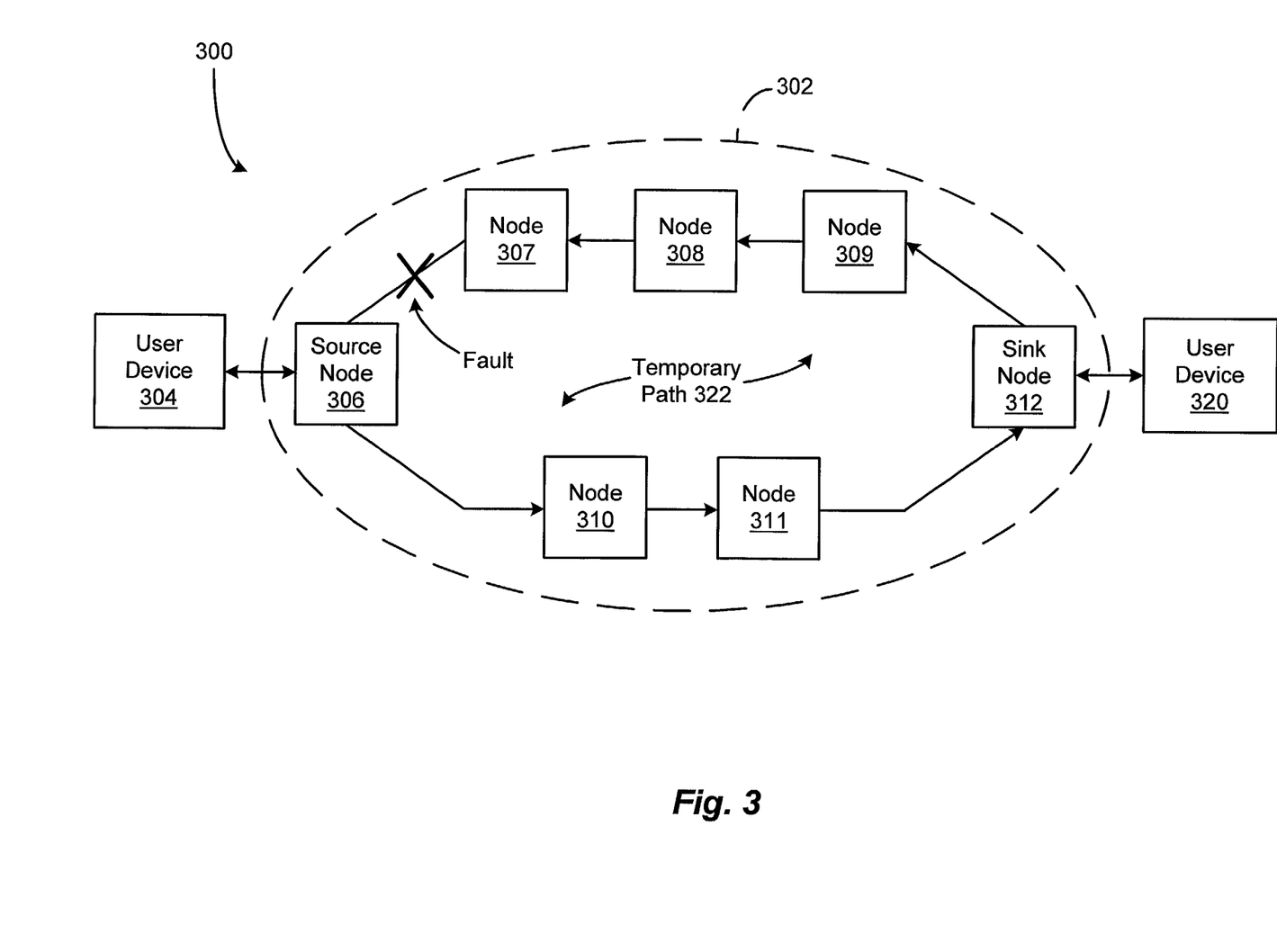
FIG. 3 is a block diagram depicting the operation of the communications network of FIG. 1 in a first fault condition.

FIG. 3 depicts an illustrative embodiment of a communications system 300 configured to perform a first resource reservation technique in accordance with the present invention. In the illustrated embodiment, the communications system 300 includes an MPLS-based communications network 302 having a ring topology. The network 302 includes a plurality of nodes 306-312 interconnected by a plurality of paths. It is noted that the nodes 306-312 are operationally identical to the nodes 106–112, respectively, of the network 102 (see FIG. 1). As shown in FIG. 3, there is a fault in the path interconnecting the source node 306 and its neighboring node 307. For example, the fault may comprise an unconnected node interface or a disconnected link. Such a fault would normally prevent the reservation of resources along a working path from the source node 306 to the sink node 312 that traverses the nodes 307–309.

Figure 4:
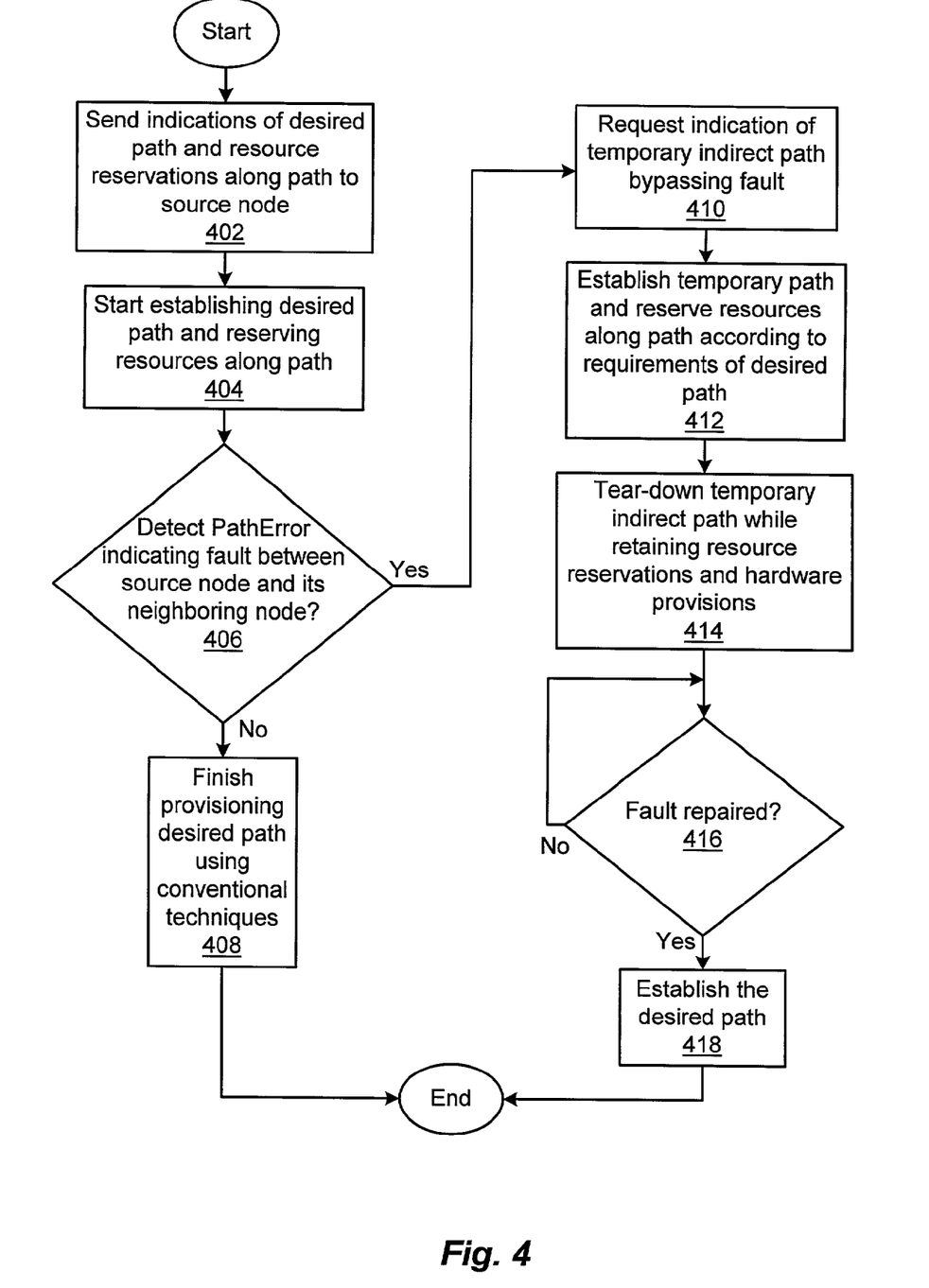
FIG. 4 is a flow diagram depicting a first resource reservation technique that can be used to reserve resources on the communications network of FIG. 3.

A first method of reserving resources on nodes along a desired path through a communications network is illustrated by reference to FIG. 4. In this first method, it is understood that there is a fault in a portion of the desired path between a source node and its neighboring node in the path. Further, the method of FIG. 4 is described below by reference to the communications system 300 of FIG. 3 for clarity of discussion.

As depicted in step 402 (see FIG. 4), the user device 304 (see FIG. 3) sends at least one control message to the source node 306 indicating (1) a desired explicit path from the source node 306 to the sink node 312 that traverses the nodes 307–309, and (2) at least one resource (e.g., a wavelength λ) to be reserved on the nodes along the desired path. For example, the indication of the desired explicit path may comprise an explicit routing list including the nodes 306-309 and 312. Next, the source node 306 starts to establish the desired path and reserve the wavelength λ along the path, as depicted in step 404, by sending at least one control message to its neighboring node 307.

A determination is then made, as depicted in step 406, as to whether the source node 306 detects an error, e.g., a PathError message, indicating a fault in the path interconnecting the source node 306 and its neighboring node 307. For example, the source node 306 may employ a state timer set to expire at the end of a predetermined time interval. If the source node 306 fails to receive an acknowledgment from the neighboring node 307 in response to the control message sent to the node 307 within the predetermined time interval, then the state timer expires, thereby causing the PathError message to be generated. In the event no PathError message is detected, the source node 306 finishes provisioning the desired path, as depicted in step 408, using conventional techniques. In an alternative embodiment, the determination of whether the path between the nodes 306 and 307 has a fault may be made by querying the routing topology manager.

In the event a PathError message is detected, the source node 306 requests, as depicted in step 410, an indication of a temporary indirect path to the node 307. In the disclosed embodiment, the source node 306 sends this request via the central protocol manager to the routing topology manager resident thereon, which responds with an explicit routing list comprising the nodes 306, 310–312, 309, 308, and 307 traversed by the temporary indirect path 322 (see FIG. 3). As depicted in step 412, the source node 306 establishes the temporary path 322 to the node 307 using a predetermined path identifier, and reserves the wavelength λ and provisions node hardware along the temporary path 322 according to the requirements of the desired explicit path.

In the disclosed embodiment, the explicit routing list of the desired path is encoded in a first RSVP opaque object. An RSVP opaque object is a user-defined data type that employs one or more spare fields within an RSVP control message for storing information to be passed to the network nodes. During the establishment of the temporary path 322, the central protocol manager resident on each node 306–309 and 312 of the desired path looks at the contents of the first RSVP opaque object to determine whether its node address is on the explicit routing list of the desired path. If the node address is on the list, then the wavelength λ is reserved on the node and the node hardware is provisioned to allow the transfer of data packets along the desired path in a direction from the source node 306 to the sink node 312.

The source node 306 then tears-down the temporary indirect path 322, as depicted in step 414, while retaining the wavelength reservations and hardware provisions of the desired explicit path. In the disclosed embodiment, a second RSVP opaque object is encoded to enable the nodes 306–312 to distinguish between a user-driven tear-down control message requiring the release of node resources and a failure-driven tear-down control message that does not require the release of node resources. By employing the failure-driven tear-down control message to tear-down the temporary path 322, the source node 306 can assure that the wavelength reservations and hardware provisions on the nodes 306–309 and 312 along the desired path are retained after the temporary path 322 is torn-down.

Next, a determination is made, as depicted in step 416, as to whether the fault between the nodes 306 and 307 is repaired to enable the establishment of the desired explicit path. For example, such a determination may be made by querying the routing topology manager. In the event the fault is repaired, the source node 306 establishes, as depicted in step 418, the desired path traversing the nodes 306–309 and 312 using the same predetermined path identifier of the temporary path 322. This path identifier is provided to the central protocol manager resident on each node 306–309 and 312 to direct the respective central protocol managers not to reallocate the prior wavelength reservations or modify the prior node hardware provisions along the desired explicit path.

Figure 5:
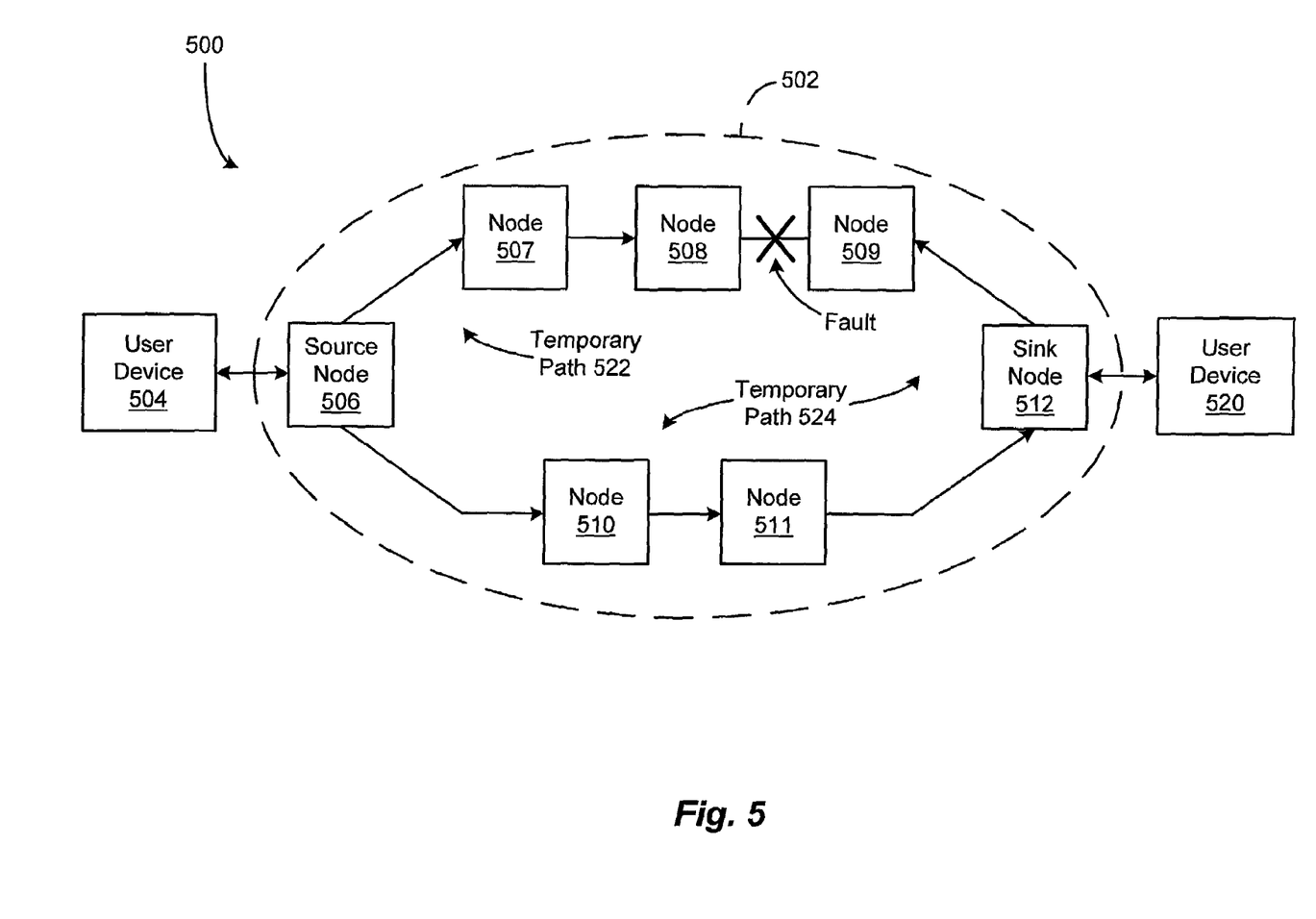
FIG. 5 is a block diagram depicting the operation of the communications network of FIG. 1 in a second fault condition.

FIG. 5 depicts an illustrative embodiment of a communications system 500 configured to perform a second resource reservation technique in accordance with the present invention. In the illustrated embodiment, the communications system 500 includes an MPLS-based communications network 502 having a ring topology. The network 502 includes a plurality of nodes 506–512 interconnected by a plurality of paths. The nodes 506–512 are operationally identical to the nodes 106–112, respectively, of the network 102 (see FIG. 1). As shown in FIG. 5, there is a fault in the path interconnecting the neighboring intermediate nodes 508 and 509. Such a fault would normally prevent the reservation of resources along a working path from the source node 506 to the sink node 512 that traverses the nodes 507–509.

Figure 6:
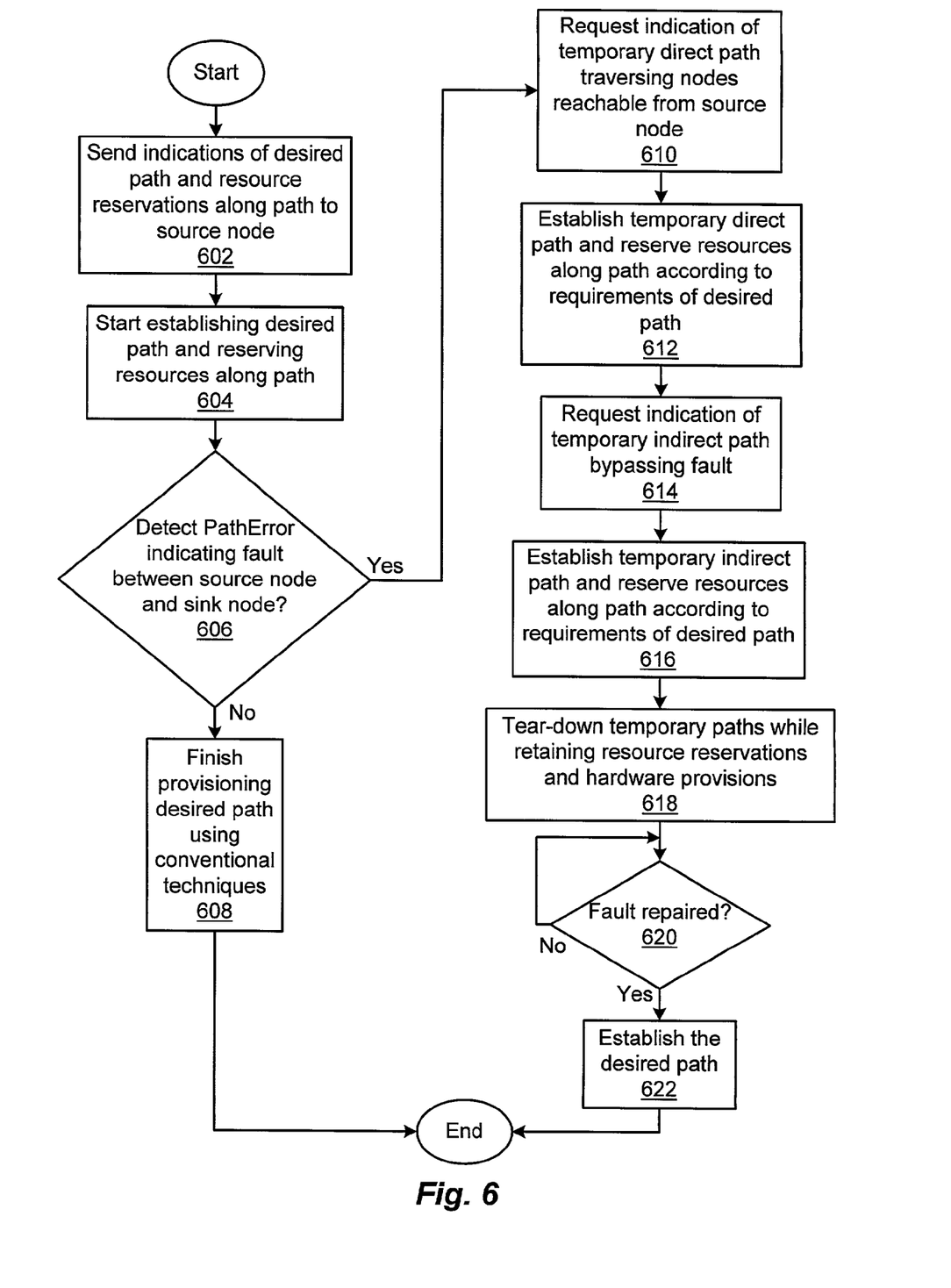
FIG. 6 is a flow diagram depicting a second resource reservation technique that can be used to reserve resources on the communications network of FIG. 5.

A second method of reserving resources on nodes along a desired path through a communications network is illustrated by reference to FIG. 6. In this second method, it is understood that there is a fault in a portion of the desired path between a pair of neighboring nodes that does not include the source node. Further, the method of FIG. 6 is described below by reference to the communications system 500 of FIG. 5 for clarity of discussion.

As depicted in step 602 (see FIG. 6), the user device 504 (see FIG. 5) sends at least one control message to the source node 506 indicating (1) a desired explicit path from the source node 506 to the sink node 512 that traverses the nodes 507–509, and (2) at least one resource (e.g., a wavelength λ) to be reserved on the nodes along the desired path. Next, the source node 506 starts to establish the desired path and reserve the wavelength λ along the path, as depicted in step 604, by sending at least one control message to its neighboring node 507.

A determination is then made, as depicted in step 606, as to whether the source node 506 detects an error, e.g., a PathError message, indicating a fault in the path between the source node 506 and the sink node 512. In the event no PathError message is detected, the source node 506 finishes provisioning the desired path, as depicted in step 608, using conventional techniques.

In the event a PathError message is detected, the source node 506 requests, as depicted in step 610, an indication of the temporary direct path 522 traversing the nodes 507–508 that are directly reachable from the source node 506 via a portion of the desired path. As depicted in step 612, the source node 506 establishes the temporary direct path 522 to the node 508 using a predetermined path identifier, and reserves the wavelength λ and provisions node hardware along the temporary path 522 according the requirements of the desired explicit path, which are passed to each node 506–508 of the temporary path 522 via a first RSVP opaque object.

The source node 506 then requests, as depicted in step 614, an indication of the temporary indirect path 524 traversing the nodes 509 and 512 that are not directly reachable from the source node 506 via the desired path. As depicted in step 616, the source node 506 establishes the temporary path 524 to the node 509 using the same predetermined path identifier of the temporary direct path 522, and reserves the wavelength λ along the temporary path 524 according to the requirements of the desired explicit path, which are passed to each node 506, 510–512, and 509 of the temporary path 524 via a second RSVP opaque object.

It is noted that the source node 506 uses the temporary direct path 522 to reserve resources on the nodes 506–508 disposed on one side of the fault by accessing the nodes 506–508 in a clockwise fashion around the ring network 502. Further, the source node 506 uses the temporary indirect path 524 to reserve resources on the nodes 512 and 509 disposed on the opposite side of the fault by accessing the nodes 512 and 509 in a counterclockwise fashion around the ring network 502.

Next, the source node 506 tears-down the temporary direct path 522 and the temporary indirect path 524, as depicted in step 618, while retaining the wavelength reservations and hardware provisions of the desired explicit path. As in the first method described above, an RSVP opaque object is encoded to enable the nodes 506–512 to distinguish between a user-driven tear-down control message requiring the release of node resources and a failure-driven tear-down control message that does not require the release of node resources. By employing the failure-driven tear-down control message to tear-down the temporary paths 522 and 524, the source node 506 can assure that the wavelength reservations and hardware provisions on the nodes 506–509 and 512 along the desired path are retained after the temporary paths 522 and 524 are torn-down.

A determination is then made, as depicted in step 620, as to whether the fault between the nodes 508 and 509 is repaired to enable the establishment of the desired explicit path. In the event the fault is repaired, the source node 506 establishes, as depicted in step 622, the desired path traversing the nodes 506–509 and 512 using the same predetermined path identifier of the temporary paths 522 and 524. This path identifier is provided to the central protocol manager resident on each node 506–509 and 512 to direct the respective central protocol managers not to reallocate the prior wavelength reservations or modify the prior node hardware provisions along the desired explicit path.

In an alternative embodiment, the network 502 may employ the intermediate node 508 conceptually adjacent the fault located between the nodes 508 and 509 as a proxy for the source node 506, thereby allowing the node 508 to reserve resources along the desired path using a single temporary indirect path traversing the nodes 508, 507, 506, 510–512, and 509.

By reserving resources of at least one node along a desired explicit path via a temporary indirect path, node resources can be reserved along the desired path even if the path is currently incapable of forwarding communications packets, e.g., there may be a fault in the path. Because node resources may be pre-provisioned along the non-operational path, communications packets can be forwarded along the path as soon as the packet forwarding capability of the path is restored. In networks that employ an out-of-band control technique, this means that packets can be forwarded along the path as soon as the data path becomes viable notwithstanding the condition of the corresponding control path.

It will further be appreciated by those of ordinary skill in the art that modifications to and variations of the above-described method of pre-provisioning a light path setup may be made without departing from the inventive concepts disclosed herein. Accordingly, the invention should not be viewed as limited except as by the scope and spirit of the appended claims.

What is claimed is:

1. A communications system including a ring communications network, comprising:
   a source node;
   at least one sink node;
   a plurality of communications links configured to interconnect the source node and the at least one sink node to form a communications path through the ring network, the communications path being configured to forward data in a first direction around the ring network; and
   a plurality of first nodes disposed along the communications path,
   wherein the source node is configured to (1) identify a communications link within the communications path, at least a first one of the plurality of first nodes along the path being disposed on a first side of the identified link, and at least a second one of the plurality of first nodes along the path being disposed on a second side of the identified link, and (2) reserve resources on the nodes including the second one of the plurality of first nodes disposed on the second side of the identified link by accessing the nodes over the path in a second direction around the ring network, the second direction being opposite the first direction, and
   wherein the source node is further configured to reserve resources on the nodes including the first one of the plurality of first nodes disposed on the first side of the identified link by accessing the nodes over the path in the first direction around the ring network.

2. The system of claim 1 wherein the source node is further configured to establish a temporary path traversing the nodes disposed on the first side of the identified link.

3. The system of claim 2 wherein the source node is further configured to tear-down the temporary path while retaining the node reservations.

4. A communications system including a ring communications network, comprising:
   a source node;
   at least one sink node;
   a plurality of communications links configured to interconnect the source node and the at least one sink node to form a communications path through the ring network, the communications path being configured to forward data in a first direction around the ring network; and
   a plurality of first nodes disposed along the communications path,
   wherein the source node is configured to (1) identify a communications link within the communications path, at least a first one of the plurality of first nodes along the path being disposed on a first side of the identified link, and at least a second one of the plurality of first nodes along the path being disposed on a second side of the identified link, and (2) reserve resources on the nodes including the second one of the plurality of first nodes disposed on the second side of the identified link by accessing the nodes over the path in a second direction around the ring network, the second direction being opposite the first direction, and
   wherein the source node is further configured to establish the path without reallocating the node reservations.

* * * * *

UNITED STATES PATENT AND TRADEMARK OFFICE
CERTIFICATE OF CORRECTION

PATENT NO. : 7,110,356 B2 Page 1 of 1
APPLICATION NO. : 09/999000
DATED : September 19, 2006
INVENTOR(S) : Mashood Illikkal et al.

It is certified that error appears in the above-identified patent and that said Letters Patent is hereby corrected as shown below:

Column 5, lines 61-62, "wavelength Division Multiplexed (NDM)" should read --Wavelength Division Multiplexed (WDM)--.

Signed and Sealed this

Sixth Day of February, 2007

JON W. DUDAS
*Director of the United States Patent and Trademark Office*